Jan. 7, 1930.  E. E. SCHNELLE  1,742,451
COMPENSATING CENTER
Filed May 19, 1923   2 Sheets-Sheet 1
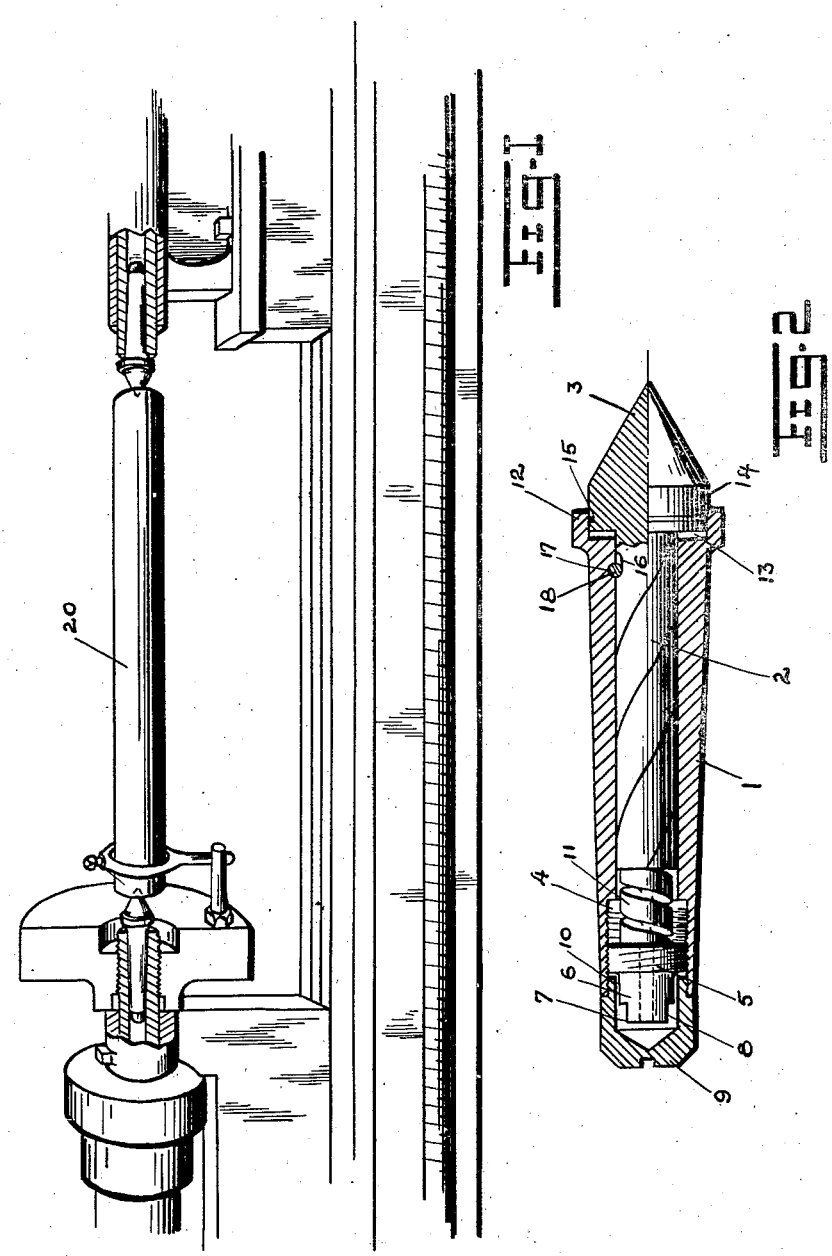
INVENTOR.
Ernest E. Schnelle
BY
Frank Keiper
ATTORNEY.

Jan. 7, 1930.   E. E. SCHNELLE   1,742,451
COMPENSATING CENTER
Filed May 19, 1923   2 Sheets-Sheet 2
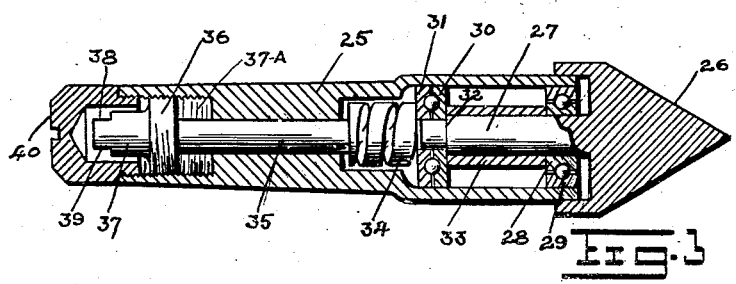
INVENTOR.
*Ernest E. Schnelle*
BY
*Frank Keifer*
ATTORNEY.

Patented Jan. 7, 1930

1,742,451

UNITED STATES PATENT OFFICE

ERNEST E. SCHNELLE, OF ROCHESTER, NEW YORK

COMPENSATING CENTER

Application filed March 19, 1923. Serial No. 626,240.

The object of this invention is to provide a new and improved form of compensating center with which extreme precision may be secured with a high degree of uniformity that will hold the work firmly and accurately in place during all conditions and during all changes in temperature of the stock being operated on.

This and other objects of this invention will be fully illustrated in the drawings, described in the specification and pointed out in the claims at the end thereof.

In the accompanying drawings,

Figure 1 is a perspective view of a portion of a lathe with one of my improved compensating centers shown in the headstock and one of my improved anti-friction centers in the tailstock of the lathe.

Figure 2 is a vertical longitudinal section of my improved compensating center.

Figure 3 shows a modification of my compensating center provided with ball bearings.

In the drawings like reference numerals indicate like parts.

In the drawings, reference numeral 1 indicates the shank of the center which is formed by a hollow sleeve. In this sleeve is mounted the spindle 2 provided with the center point 3 on the forward end thereof. The sleeve 1 is tapered rearwardly and at the rear end is recessed as indicated at 4 which recess is threaded with a female thread. In this recess is provided an adjusting screw 5 that is provided with a male thread that engages with the female thread of the recess. This screw has a reduced shank 6 which is provided with flat sides as indicated at 7 and 8 by which it may be turned by a wrench to adjust it forward and back in the recess. A cap 9 is provided, the forward end of which is reduced as indicated at 10 and which is also threaded with a male thread to engage with the female thread of the recess 4 and close the rear end of the sleeve 1. The screw 5 has a central opening therein through which the center may be oiled. The spindle 2 is provided with grooves for carrying the oil therein.

Between the adjusting screw 5 and the rear end of the spindle 2 of the center point is provided the spring 11 which is made excessively heavy and stiff so that it will yield only under great pressure but when the pressure is applied it will yield as a spring should with proper elasticity.

The forward end of the sleeve 1 is expanded as indicated at 12 and is provided with a recess 13 in which is contained the head 14 of the center, the recess and the head being cylindrical in shape so that the head can turn in the recess and move back and forth therein. A packing groove 15 is provided in the head in which is contained any suitable packing to close the joint between the head and the sleeve.

The shank 2 is recessed as indicated at 16 and the sleeve 1 is recessed as indicated at 17 and when these recesses are in line a pin 18 is driven through the opening formed thereby which locks the shank and sleeve together. The recess in the sleeve is semi-circular and the pin is securely held in place thereby. The recess of the shank is elongated and permits the shank to move back and forth relative to the pin.

In practice the parts are assembled as shown in Figure 2 with the spring 11 interposed between the adjusting screw 5 and the shank 2. The screw 5 is adjusted forward so as to throw the desired initial compression on the spring 11 and push the shank 2 forward against the pin 18. In this position the center point and its shank can yield rearwardly under great pressure and in the recess 13 sufficient clearance is provided between the head of the center point and the sleeve, to permit of ample movement to take care of any expansion in the stock that is being turned in the lathe.

As shown in Figure 1 the compensating center is mounted in the headstock of the lathe and turns with the headstock and with the stock 20 that is being turned in the lathe. As heavy cuts are made on the stock 20 the stock heats up and expands and the Bureau of Standards is said to have calculated that this expansion causes a pressure of over 5800 pounds for every cubic inch of machined steel when its temperature increases by 30° F. The center accommodates itself to this expansion of the stock by withdrawing in the sleeve as far as the work expands. The movement of the center is limited by the stop pin 18 and the resistance of the center is fixed by the elasticity of the spring 11 which is made very heavy and stiff so that the thrust due to the expansion of the stock 20 on the centers in both the head stock and the tailstock will not destroy the centers or impair their accuracy.

It will also be understood that the center in the tailstock is an anti-friction or ball bearing center and the spring 11 in my improved compensating center in the headstock will protect the part in the anti-friction center in the tailstock from excessive pressure.

In Figures 3, 4 and 5 I have shown these centers provided with ball bearings so that the compensating center can be used in the tailstock of the lathe.

In Figure 3 reference numeral 25 indicates the sleeve of the center and reference numeral 26 indicates the head of the center that is formed on the outer end of the shank 27 as an integral part thereof. The inside diameter of the forward portion of the sleeve 25 is enlarged to form a chamber in which the shank 27 is supported by the ball races 28 and 29 near the head of the shank and the ball races 30 and 31 at the rear of the shank. Suitable balls between these two pair of ball races provide the anti-friction bearings which rotatably support the front and rear of the shank in the enlarged chamber of the sleeve. The rear end of the shank is reduced in diameter and the shoulder 32 formed thereby transmits the end thrust of the shank against the ball races 30 and 31 and the anti-friction thrust bearing formed by them. Surrounding the shank 27 and suitably fastened thereto if only by a pressed fit is a spacing sleeve 33 which separates the anti-friction thrust bearing at the rear end of the shank from the anti-friction radial bearing near the front end of the shank. The ball race 29 of the radial anti-friction bearing is fastened into the inside of the chamber as for example by means of a pressed fit so that after the anti-friction bearings both at the front and rear of the shank have been put in place and the assembly forced into the chamber, the shank is held against endwise movement in the chamber by the pressed fit or other suitable fastening means between the ball race 29 and the inside of the chamber, and a similar fastening means between the shank and the spacing sleeve 32. Supporting the race 31 is provided the spring 34 which in turn is supported by the spindle 35 which is mounted in the sleeve 25 and is supported by the adjusting screw 36 that is provided with a male thread that engages with the female thread in the recess 37 on the sleeve. The screw 36 has a reduced shank 37 which is provided with flat sides as indicated at 38 and 39 by which it may be turned by a wrench to adjust it forward and back in the recess. A cap 40 is provided, the forward end of which is reduced and is threaded with a male thread to engage with the female thread of the recess 37 and close the rear end of the sleeve 25.

I claim:

1. A compensating center comprising a sleeve, a shank mounted within said sleeve, a head on the outer end of said shank and projecting from said sleeve, a yielding cushioning member located within said sleeve and acting against the inner end of said shank, means for holding said cushioning member against endwise movement in the direction of expansion of said cushioning member and a flange overhanging the portion of said shank that projects from said sleeve thus providing a covered annular recess between the end of said sleeve and the back of said head for the movement of said head toward said sleeve.

2. A compensating center comprising a sleeve, a shank mounted within said sleeve, a head on the outer end of said shank and projecting from said sleeve, a yielding cushioning member located within said sleeve and acting against the inner end of said shank, and an anti-friction bearing located between said shank and said sleeve to allow the rotation of said shank in front of said yielding cushioning member and to prevent an endwise movement of said shank out of said sleeve.

3. A compensating center point for head and tail stocks comprising a sleeve adapted to be frictionally held in place against endwise movement and rotation within a head or tail stock, a shank within said sleeve, a head formed on said shank, an adjustable plug in said sleeve and a yielding member yielding only under extreme pressures interposed between said shank and said plug to hold said shank against endwise movement toward said plug except under extreme pressures. said plug being adapted to constantly hold said yielding member against the end of said shank, and normally hold said shank against endwise movement toward the rear of said sleeve without exerting any pressure against said shank in the opposite direction, and means for holding said shank against movement in the opposite direction.

4. A compensating center point for head and tail stocks comprising a sleeve adapted to be frictionally held in place against endwise movement and rotation within a head or tail stock, a shank within said sleeve, a head formed on said shank, an adjustable plug in said sleeve and a yielding member yielding only under extreme pressures interposed between said shank and said plug to hold said shank against endwise movement toward said plug except under extreme pressures, said plug being adapted to constantly hold said yielding member against the end of said shank, and normally hold said shank against endwise movement toward the rear of said sleeve without exerting any pressure against said shank in the opposite direction, and means for holding said shank against movement in the opposite direction, anti-friction bearings rotatably supporting said shank within said sleeve between said yielding member and said means for holding said shank against movement away from said yielding member.

5. A compensating center comprising a fixed supporting member, a shank mounted to rotate within said supporting member, a head formed on the outer end of said shank, and projecting from said supporting member, an anti-friction bearing supporting said shank within said supporting member, a cushioning member within said supporting member normally holding said shank against movement in one direction but yieldingly resisting an overload pressure against said shank and means cooperating with said antifriction bearing to hold said shank against endwise movement in the opposite direction and free from the end thrust of said cushioning member.

6. A compensating center comprising a supporting member having a chamber formed at one end thereof, a shank located within said chamber and rotatably and slidably supported in said chamber, a cushioning member located within said chamber and normally holding said shank against movement into said chamber without exerting any pressure against said shank to allow said shank to rotate freely within said anti-friction bearing, said cushioning member being adapted to yield to excessive pressure against said shank and allow said shank to move endwise in said anti-friction bearing in one direction and means for holding said shank against endwise movement in said anti-friction bearing in the opposite direction.

7. A compensating center comprising a fixed supporting member, a chamber formed in one end of said supporting member, a shank rotatably supported in said chamber, a center point carried by the outer end of said shank and projecting from said chamber, a cushioning member within said chamber and means intermediate of said head and said cushioning member for normally holding said shank free from the end thrust of said cushioning member and against endwise movement away from said cushioning member, said means allowing the movement of said shank toward said cushioning member to yieldingly resist an overload pressure against the center point.

8. In a compensating center, the combination of a shank adapted to be mounted in a socket with one end thereof, a chamber formed in the other end of said shank, an anti-friction bearing, a spindle supported by said antifriction bearing and mounted to freely rotate within said chamber a cushioning member yieldingly resisting the endwise movement during a free rotation of said spindle within said chamber and means cooperating with said antifriction bearing for locking said spindle against endwise movement out of said chamber.

9. In a compensating center, the combination of a stationary support, a chamber formed in one end of said support, a shank rotatably supported in said chamber, a cushioning member located within said chamber and yieldingly resisting the endwise movement of said shank due to pressure against said shank and means for holding said shank against endwise movement within said chamber and free from the expansive pressure of said cushioning member to allow said shank to rotate freely within said shank before pressure is applied against said shank.

In testimony whereof I affix my signature.

ERNEST E. SCHNELLE.